Aug. 25, 1942.  H. F. McLOUGHLIN  2,293,994
ALTERNATING CURRENT SYNCHRONOUS MOTOR
Filed Dec. 11, 1940   2 Sheets-Sheet 1

INVENTOR
Harold F. McLoughlin,
BY
Smith, Michael & Gardiner,
ATTORNEYS.

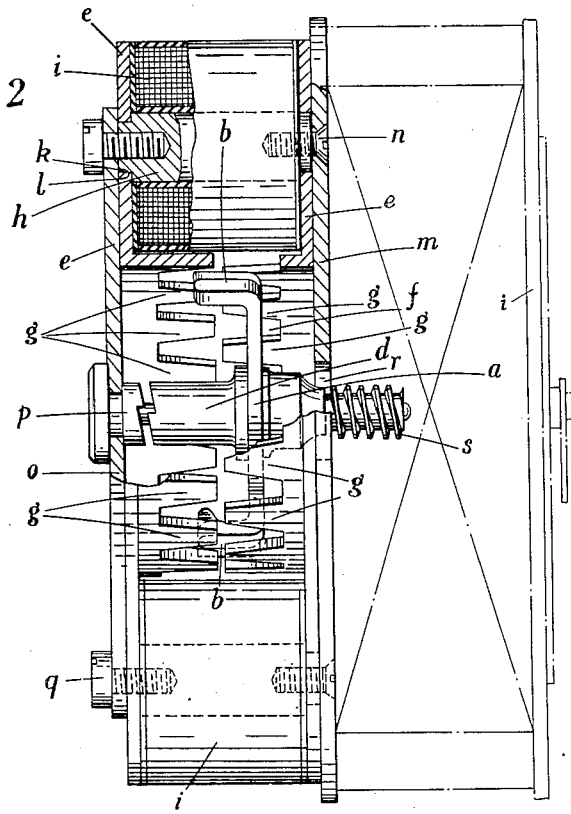

Patented Aug. 25, 1942

2,293,994

UNITED STATES PATENT OFFICE 2,293,994

ALTERNATING CURRENT SYNCHRONOUS MOTOR

Harold Fletcher McLoughlin, Walsall, England

Application December 11, 1940, Serial No. 369,644
In Great Britain December 30, 1939

4 Claims. (Cl. 172—278)

This invention relates to improvements in and connected with alternating current synchronous motors, and is particularly concerned with motors adapted for electric clocks, time switches and so on.

One object of the present invention is to provide an improved construction in which the length of the energizing coil or solenoid is advantageously high in relation to its diameter, thereby enhancing the efficiency of the motor, while ensuring cool-running characteristics. A further object is to provide improved means for ensuring the unidirectional rotation in the desired direction of parts driven by small self-starting alternating current motors. A still further object is to provide an efficient arrangement of simple and compact construction which can be economically produced and assembled.

According to this invention, coils for energizing the stator are wound round cores disposed externally of the circumference of annular pole teeth thereof. The cores disposed parallel with the axis of the stator, may be mounted between the outer ends of a pair of similarly constructed plates formed with centrally plunged-out pole teeth, the cores being adapted for locating the pole teeth of respective plates in position relatively to one another. Thus the cores may be formed with reduced ends mounted in aligning openings in the plates, so that on assemblage the teeth are brought into correct register relatively to one another.

By mounting the coils on cores having their axes externally of the ring of stator teeth, their diameter is not governed by that of such ring and consequently can be desirably small. At the same time the provision of two coil sections or two separate coils in series enables the length of the coil system to be increased. Hence the ratio of length to diameter is desirably high as compared with known arrangements, the coil or solenoid having a length approximately equal to twice the length of the normal magnetic circuit while the ampere-turns to resistance ratio is improved. Thus the improvements provide a motor of high efficiency and possessing cool running characteristics.

Each of the stator members may consist of a flat plate having an annular series of equally spaced pole teeth disposed at right angles to the plane of the plate. The teeth may be formed by centrally plunging a plate, the plunged portion being notched or gapped to provide teeth which taper slightly towards the tips.

The rotor may comprise a flat plate permanent magnet of somewhat rectangular form mounted on an axially slidable sleeve and formed at each end with teeth bent at right angles to the plane of the plate. The rotor is adapted to move in an axial direction and is associated with means adapted to reverse its rotation if it should start to rotate in the undesired direction. Thus the rotor, slidably mounted on an axial bearing, may be provided with a worm meshing with a worm wheel for causing the rotor to move axially on the bearing in a direction dependent on the sense of rotation at starting. In an extreme position to which the rotor is axially moved due to rotation in the undesired direction, recoil or stop means is effective for imparting a reverse rotation which thereupon disengages the rotor from such means and the rotor continues its rotation in the desired sense. In one direction the axial movement is limited by a stop, while in the other it causes the engagement of the stop or recoil means, which may comprise complementary toothed parts formed on a slidable rotor sleeve and on an abutment on the frame. The engagement of such parts causes the rotor to recoil and reverse its rotation to effect their disengagement and the continued rotation by the rotor in the desired direction.

In order to enable the invention to be readily understood reference will now be made to the accompanying drawings illustrating by way of example one construction for carrying the invention into effect in which drawings:

Figure 2 is a plan view looking in the direction of the arrow Figure 1, the upper portion being shown in section;

Figure 3 is a plan view looking in the direction of the arrow Figure 1, certain parts being shown in chain line.

Figure 1:
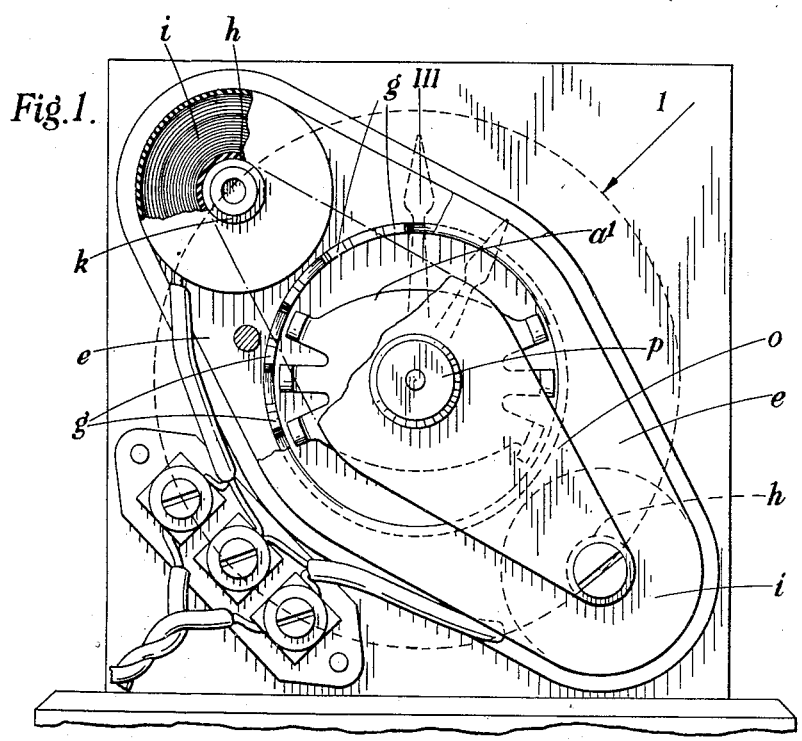
Figure 1 is an end elevation with parts in section.

Referring to the drawings, the rotor $a$ consists of a plate $a'$ of permanently magnetised steel having pole teeth $b$ at its ends bent at right angles to the plane of the plate. The rotor, disposed within a stator $c$ is mounted on a sleeve $d$ extending through a central opening in the plate. A pair of iron plates $e$ of somewhat elliptical shape are centrally plunged, each plunged portion being notched at $f$ to provide an annular set of stator teeth $g$ disposed at right angles to the plane of a plate and slightly decreasing in width from their roots to their tips. The similarly constructed stator elements are arranged so that the teeth of one plate are directed towards the other element, the tips of one set being disposed opposite the gaps $f$ between the other set. The plates are secured together near their ends by means of iron cores $h$ so that the extremities of the tips of the teeth on the plates are disposed midway between and parallel with the planes of the plates. The iron cores, wound with coils $i$ connected in series, have reduced ends $k$ which are mounted in small aligning openings $l$ in the plates, thereby locating the teeth $g$ of the respective plates in correct annular alignment.

A supporting plate $m$ is secured by screws $n$ co-axial with the cores $h$ to the outer face of one of the stator members, and a smaller plate $o$ for carrying a bearing $p$ for the rotor $a$ is similarly mounted by screws $q$ on the outer face of the other stator member. Such arrangement ensures accurate and central mounting of the rotor bearing while registration of the plates is ensured on the shoulders of the cores $h$ the rotor $a$ being concentrically disposed within the stator teeth $g$. When the coils $i$ are energised by an alternating current, an alternating flux is produced in the magnetic circuit comprising the coils $i$, the stator plates $e$, the stator teeth $g$ and the air gap between the teeth of respective plates. Thus the polarity of the pole teeth changes rapidly in accordance with the cyclic variations in current, and the permanently magnetised rotor $a$ rotates in step at a speed predetermined by the number of stator and rotor teeth.

The supporting plates $m$, $o$ are of somewhat elliptical shape, the plate $m$ mounted on the casing of the clock is formed between its ends with an opening $r$ through which extends a worm $s$ driven by the rotor for communicating drive to the clock mechanism. The plate $o$ carries the bearing $p$ for the rotor, which is axially slidable to a limited extent, the arrangement being such that in either extreme position of such axial movement, the rotor teeth $g$ lie on either side of the plane passing through the extremities of the stator teeth. Moreover, when at rest, the teeth at one end of the rotor are radially opposite gaps $f$ in one stator plate $a$ and radially opposite teeth $g$ in the other plate.

Thus at any instant the north end of the rotor will be opposite the north of the stator, when the south end of the rotor is opposite the south of the stator. Under these conditions, the rotor will move in either direction according to its position of rest, due to the repelling action of the two like magnetic fields, and the attraction of the unlike magnetic fields. The alternating current in the coils $i$ causes similar alternating magnetic fluxes in the stator poles so that the initial movement of the rotor transforms this alternating flux into an apparent rotating flux with which it keeps in step.

In the construction described the stator is formed with thirty teeth, fifteen being provided on each plate. The number of teeth on the rotor is preferably such that when that number is divided into the number of teeth on the stator, the quotient is an odd number. In the example described the rotor has six teeth, three being formed at each end. The speed of the motor in revolutions per minute is given by the number of cycles of the supply multiplied by sixty, and the product divided by the number of pairs of poles in the stator.

The rotor sleeve $d$ is formed for the greater part of its length with an axial bore $t$ into which extends a spindle $u$ mounted on the framework of the motor. The arrangement enables the sleeve with the rotor mounted thereon to slide axially on the spindle at starting. One end of the sleeve is formed with a wedge-like tooth $v$ projection while a complementary wedge-like notch $w$ is formed in a collar $x$ secured to the framework $i^1$.

The slidable movement of the sleeve $d$ in one direction is limited by the engagement of its tooth $v$ with the collar $x$ while the movement in the other direction, for causing disengagement of the tooth from the notch $w$, is limited by the abutment of the other end of the sleeve member with a fixed stop $2$ on the frame of the mechanism. This end of the sleeve member is of reduced diameter and is formed or provided with the worm $s$ which meshes with the worm wheel $3$ constituting the first wheel of the reduction gear.

The sleeve with the rotor $a$ mounted thereon is free to move axially on the spindle $u$ between the notched collar $x$ and the stop $2$ at starting. Upon rotation of the rotor at starting it will move axially in either direction owing to the inertia of the gear train $s^3$ with which it is engaged. If the initial rotation moves the sleeve so that its tooth $v$ engages with the notch $w$ a recoil is imparted to the sleeve which causes it to reverse its rotation when it will continue to rotate in the desired direction. Such reversal effects disengagement of the recoil means since the meshing of the worm $s$ and worm wheel $3$ causes the sleeve to move axially away from the extreme position in which the recoil means is engaged. If the rotor should commence rotation in the desired direction, such rotation is continued without obstruction from the recoil means. The rotor only moves axially at starting and when running freely will occupy an intermediate position which is its normal magnetising balanced centre.

The improvements provide an efficient alternating current synchronous motor particularly suitable for electric clocks, the stator members $e$ of identical construction being capable of simple and economical construction. The rotor can also be readily produced from a flat strip, the teeth thereon being simply bent from the ends of the latter, while the supporting plates facilitate assemblage and ensure adequate centering and mounting of the rotor. In addition the arrangement enables the employment of a divided energising coil system for enhancing the efficiency of the motor as hereinbefore described.

What I claim is:

1. A small self-starting synchronous motor without shading poles and including an unbalanced permanent magnet rotor with salient poles and slidably mounted on an axial bearing, a stator comprising a pair of plates each formed with centrally plunged-out and annularly disposed pole teeth projecting at right angles to the plane of the plate, the teeth on respective plates extending towards each other to constitute a plurality of pairs of poles of alternate polarity, cores assembled between said plates externally of the circumference of said teeth and disposed parallel with the central axis of the plates and adapted for locating the teeth of respective plates in position relatively to one another, series-connected coils around said cores, a gear train having back-lash engageable with said rotor and possessing inertia to cause axial movement of the rotor according to its initial direction of rotation, and cooperative parts on the slidable rotor and on the motor frame-work, said parts being adapted to cooperate when the rotor is moved axially due to initial rotation in the wrong direction for causing reversal of rotation and continued rotation in the desired direction.

2. A small self-starting synchronous motor without shaded poles and including a permanent magnet rotor with salient poles and engageable with a gear train having backlash, a stator comprising a pair of members each having a ring of teeth extending towards each other to form the stator poles, coils for energizing the stator to produce around the rotor an annulus composed of a plurality of pairs of stator poles of alternate polarity, cores for said coils disposed externally of the circumference of the annulus of stator teeth and disposed parallel to the axis of the stator, said rotor being mounted on an axial bearing, and means adapted for imparting a reverse rotation to the rotor in the event of its rotation in the undesired direction.

3. A small self-starting synchronous motor without shaded poles and including an unbalanced permanent magnet rotor with salient poles and slidably mounted on an axial bearing, a stator comprising a pair of plates of somewhat elliptical shape each formed with centrally plunged-out and annularly disposed pole teeth projecting at right angles to the plane of the plates, the teeth on respective plates extending towards each other to provide a plurality of pairs of poles of alternate polarity, cores assembled between said plates externally of the circumference of said teeth and disposed parallel with the central axis of the plates, series-connected coils wound round said cores, a gear train engageable with said rotor to cause slidable movement of such rotor on its bearing in a direction dependent on its sense of rotation, and fixed stop means engageable with the rotor in the event of its initial rotation in the undesired direction to cause reversal of such rotation.

4. A small self-starting synchronous motor without shaded poles in accordance with claim 3 and comprising an axially slidable rotor formed with a toothed part and a cooperating toothed part on the motor frame-work, a gear train including a worm and worm wheel driven by said rotor, and the inertia of which causes axial movement of the rotor according to its initial direction of rotation, the engagement of the toothed parts causing reversal of rotation and continued rotation in the desired direction.

HAROLD FLETCHER McLOUGHLIN.